Patented Oct. 2, 1934

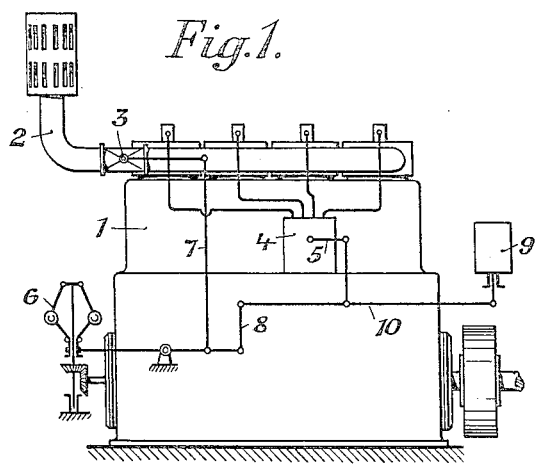
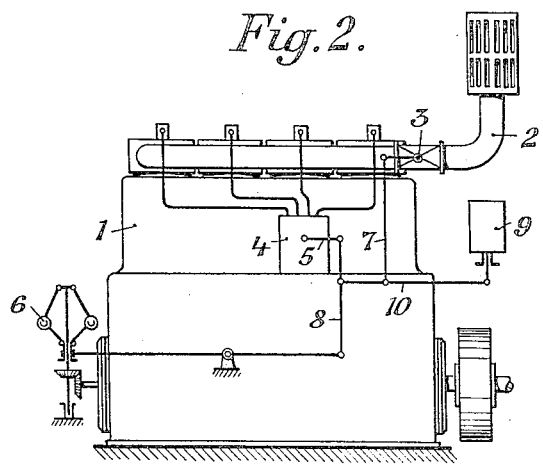

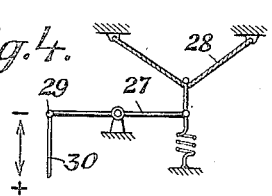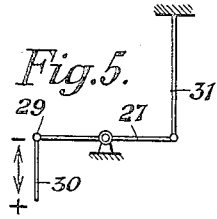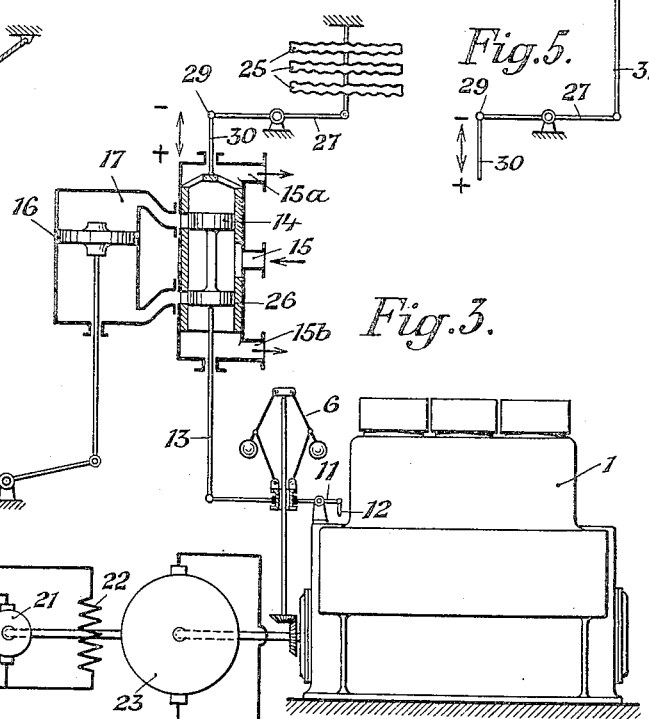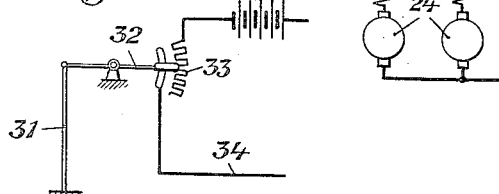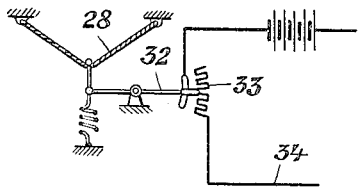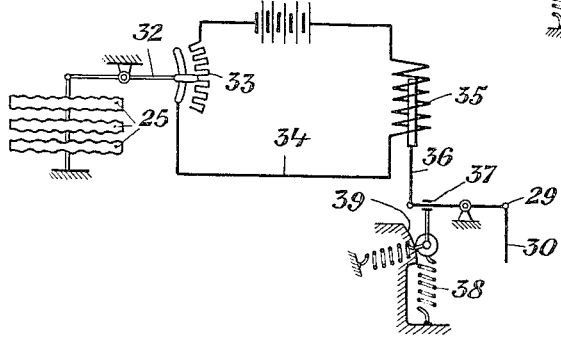

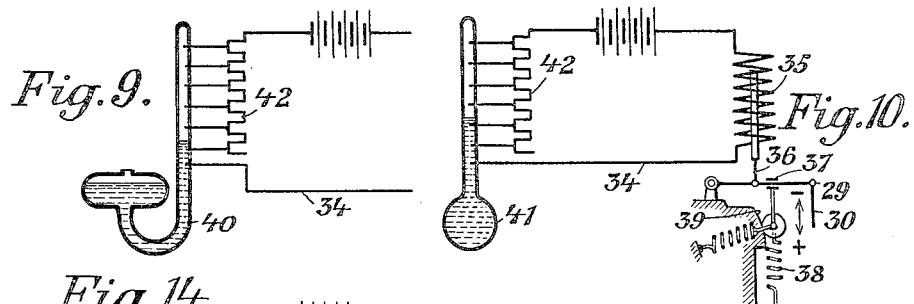
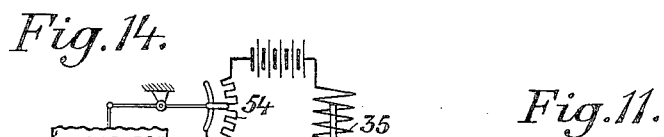
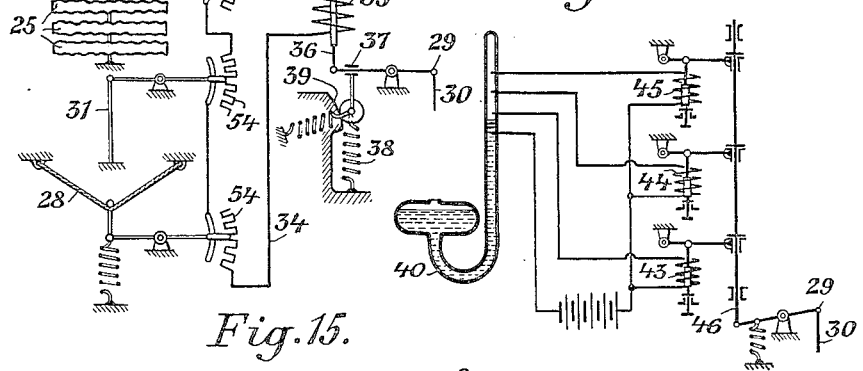
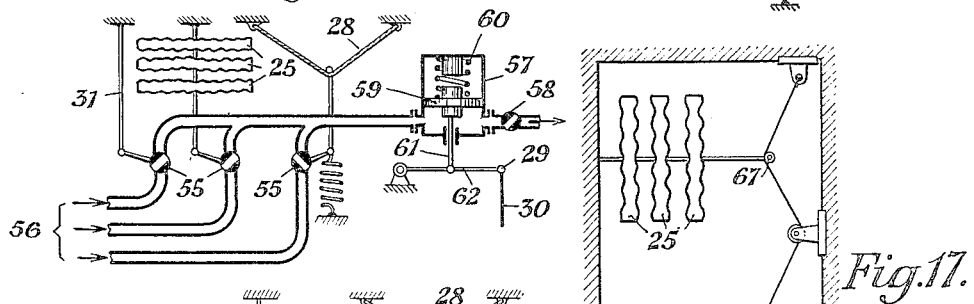
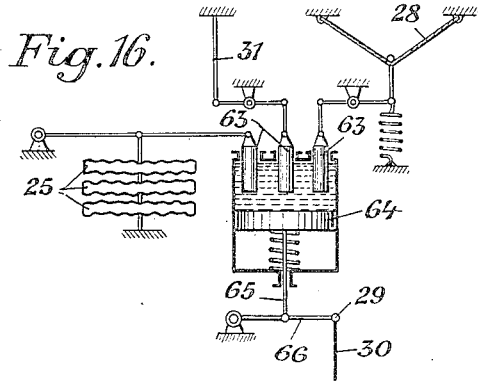
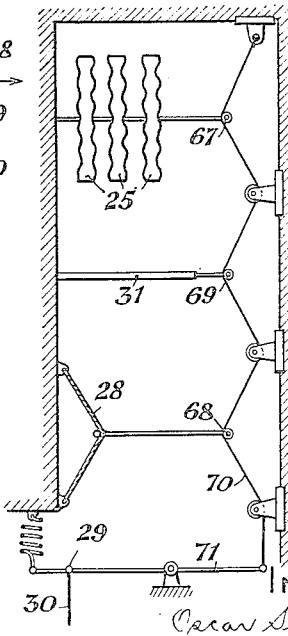

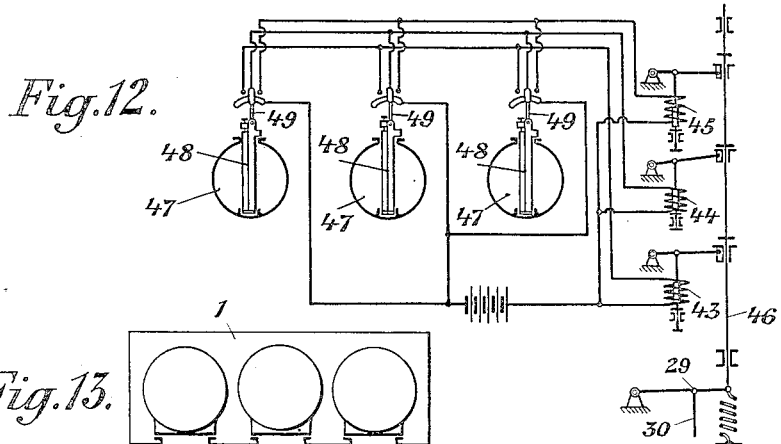
Fig.12.
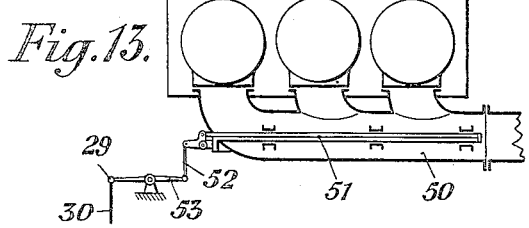
Fig.13.
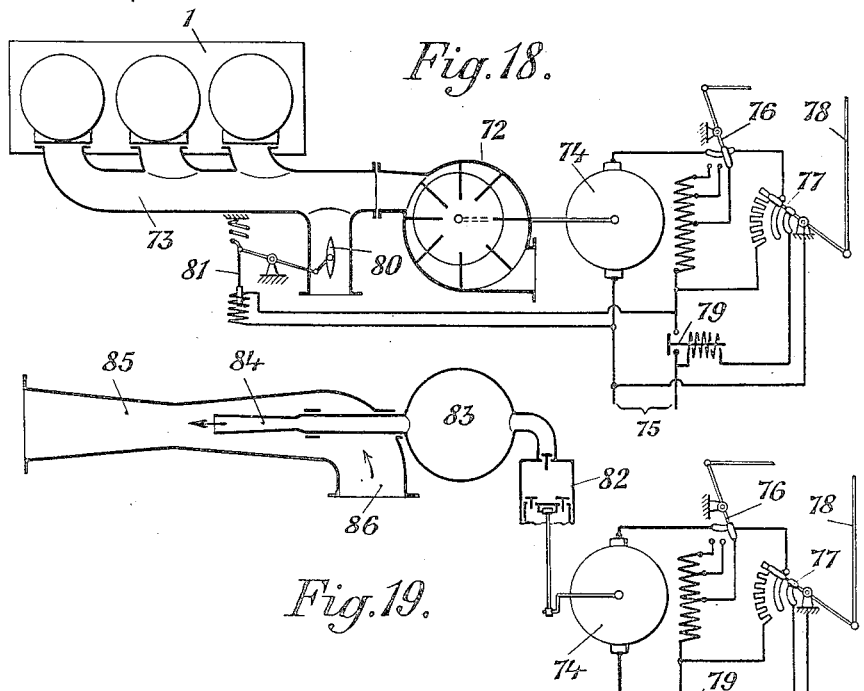
Fig.18.
Fig.19.

1,975,624

UNITED STATES PATENT OFFICE 1,975,624

INTERNAL COMBUSTION ENGINE POWER UNIT FOR VEHICLES

Oscar Simmen, Erlach, Switzerland, assignor to the firm of Sulzer Frères Société Anonyme, Winterthur, Switzerland Application June 20, 1933, Serial No. 676,615
In Switzerland June 24, 1932

13 Claims. (Cl. 290—17)

This invention relates to internal combustion engine power units for vehicles.

An internal combustion engine driving a vehicle must necessarily operate at various altitudes and under varying climatic conditions so that the density of the air available for the purposes of combustion of the fuel in the engine must also vary. The ratio of the oxygen content of the air drawn into the cylinder to the volume of such air varies, for example, in accordance with variations in barometric pressure, atmospheric temperature and moisture content or humidity of the atmosphere. Since an economically efficient combustion of the fuel within the engine cylinder can only be obtained especially with a Diesel-engine, with a fixed ratio of fuel to air, variations of this nature tend to result in loss of power and the present invention has for its object to overcome this difficulty.

To this end according to the present invention the fuel-air ratio of the charge supplied to the engine is automatically determined by or in accordance with a condition or conditions of the atmosphere. The fuel-air ratio may be determined by automatic adjustment of the quantity of fuel or the quantity of air, or both in accordance with a condition or conditions of the atmosphere.

The ratio of the quantity of fuel to the weight of air may be automatically controlled in accordance with the pressure, temperature or moisture content of the atmosphere or in accordance with any two or all of these conditions. If desired the said ratio may be automatically controlled in accordance with a condition of the exhaust gases as affected by a condition or conditions of the atmosphere.

In the accompanying drawings,

Figures 1 and 2 illustrate respectively two constructions of internal combustion engine each embodying one form of the invention, Figure 3 is a diagrammatic illustration of an internal combustion engine-electric power unit also embodying the invention, Figures 4 and 5 show respectively two alternative forms of control device which may be employed, Figures 6, 7 and 8 illustrate the manner in which regulating movements may be transmitted from the control devices shown in Figures 3, 4 and 5 respectively, Figures 9 and 10 show two further forms of control device and the transmission means associated therewith, Figure 11 illustrates an arrangement employing the control device shown in Figure 9 with a modified arrangement of the transmission means, Figures 12 and 13 show two modified arrangements both according to the invention, Figures 14, 15, 16 and 17 are further constructions each combining several forms of regulating device, and Figures 18 and 19 illustrate two constructions in each of which the supply of air to the engine is regulated in accordance with the invention.

In the construction illustrated in Figure 1 the internal combustion engine 1 for the propulsion of a vehicle draws air through an air supply pipe 2 furnished with a regulating valve 3, fuel being delivered to the cylinders of the engine by a fuel pump 4. The supply of fuel is regulated by means of a lever 5, a governor 6 driven by the engine being connected through a link 7 to the air valve 3 and through a link 8 to the fuel control lever 5. The governor 6 thus automatically adjusts the quantity of air and fuel in accordance with the speed of the engine.

A control device 9, such for example as one of those hereinafter described and operating in accordance with variations in a condition of the atmosphere, is operatively connected through a lever 10 to the fuel control lever 5 so that the control device 9 influences the fuel supply, thereby automatically determining the fuel-air ratio in accordance with a condition of the atmosphere.

In the construction illustrated in Figure 2 the control device 9 is connected through the lever 10 not only to the fuel control lever 5 but also through the link 7 to the air valve 3. In this way the control device 9 automatically influences not only the quantity of fuel but also the quantity of air in accordance with a condition of the atmosphere so that the fuel-air ratio is maintained at a value desirable for efficient combustion.

In the construction illustrated in Figure 3 the internal combustion engine 1 is furnished with a governor 6 the sleeve of which engages a pivoted lever 11 connected by a link 12 to the fuel pump or other means for regulating the quantity of fuel in accordance with the speed of the engine, thereby tending to maintain the engine speed substantially constant at a predetermined value. Moreover, the excitation of the current generator 23 is subjected to the action of the speed governor 6 so that the number of rotations of the engine is adjusted to be, at first, invariable. The lever 11 is connected by a rod 13 to a piston valve 14 which controls the flow of pressure medium from an inlet 15 to one side or the other of a piston 16 of a servo-motor 17 and from the cylinder through discharge conduits 15a and 15b. The piston 16 of the servo-motor 17 controls a rheostat 18 arranged in a control circuit 19 which is under the control of the driver by means of a drum regulator 20. The control circuit 19 includes an excitation current generator 21 driven by the engine 1 for the purpose of supplying current to the field winding 22 of, and thereby controlling the voltage of, a main current generator 23 also driven by the engine. The current generated by the main current generator 23 supplies power to the traction motors 24 of the vehicle.

The load on the internal combustion engine 1 is a function of the voltage and current supplied to the traction motors 24. While the main current generator 23 and therefore the engine 1 are not overloaded, the output of the current generator 23 will not be reduced by adjustment of the rheostat 18. When however the load on the current generator 23 exceeds that to which the internal combustion engine is to be subjected, the load on the generator 23 and therefore the load on the engine will be automatically reduced by adjustment of the rheostat 18 as hereinafter described. When the load on the generator tends to rise the speed of the engine will tend to fall and the rod 12 will be moved upwards to increase the quantity of fuel supplied. At the same time the rod 13 and piston valve 14 will be moved downwards so that pressure medium will flow from the inlet 15 to the servo-motor 17 beneath the piston 16. The piston 16 will thus rise and increase the effective resistance of the rheostat 18, thereby reducing the current flowing through the field winding 22 and reducing the load on the engine. Conversely, when the load on the generator tends to decrease the fuel supplied to the engine will be reduced and the piston valve 14 will be moved upwards to admit pressure medium to the cylinder 17 above the piston 16, thereby reducing the effective resistance of the rheostat 18 and increasing the load on the generator 23.

When the air pressure decreases, for example, in overcoming a difference in altitude, a smaller amount of oxygen is fed to the engine with respect to the sucked volume of air, so that the combustion becomes imperfect with a smaller than the maximum amount of fuel. In order to overcome this difficulty a control device 25 in the form of an aneroid barometer is provided for automatically adjusting the position of a sleeve 26 within which the piston valve 14 can reciprocate, the sleeve 26 being furnished with ports which cooperate with the inlet 15 and the passages leading respectively to opposite sides of the piston 16. The control device 25 is connected through a lever 27 to the upper end 29 of a rod 30 carried by the sleeve 26. Thus, when the pressure of the atmosphere falls, for example due to the vehicle being employed at a higher altitude, the sleeve 14 will be moved upwards so that the speed of the engine at which pressure medium is admitted to the lower face of the servomotor piston will be higher. At low air pressures, i. e. high altitudes, the effective value of the resistance 18 will therefore be increased and the load on the generator 23 decreased at a higher engine speed than when the air pressure is high. Conversely, when the atmospheric pressure increases due to the vehicle being employed at a lower altitude the sleeve 14 will be moved downwards and the effective resistance of the rheostat 18 will not be increased to reduce the load on the main generator, and therefore the engine, until a relatively low engine speed has been reached. By automatic adjustment of the fuel supply in accordance with variations in the atmospheric pressure in this manner the fuel-air ratio for the engine is automatically adjusted so as to tend to avoid inefficient combustion of the charge with consequent loss of power.

Instead of controlling the fuel-air ratio in accordance with the atmospheric pressure this regulation may be effected in accordance with the humidity or moisture content of the atmosphere. Thus, for example, as illustrated in Figure 4, the control device may comprise a cord 28 anchored at each end and connected to one end of a lever 27, the other end of which is connected to the upper end 29 of the rod 30 (Figure 3). When the moisture content of the air rises the rod 30 is moved upwards, whilst when the moisture content falls the rod will be moved downwards. In this way with a high moisture content in the atmosphere the quantity of fuel supplied to the engine will be less than that supplied when the moisture content of the atmosphere is low.

Alternatively the control device may operate in accordance with the temperature of the atmosphere as shown, for example, in Figure 5, in which the control device comprises a rod 31 which expands or contracts in accordance with the temperature of the atmosphere. When the atmospheric temperature increases the rod 31 expands and moves the rod 30 upwards, thereby reducing the quantity of fuel supplied to the engine. Similarly when the temperature of the atmosphere falls the rod 30 will be moved downwards so as to increase the quantity of fuel supplied.

Instead of the control impulses being imparted mechanically from the control device to the rod 30, these impulses may be transmitted electrically. Thus as shown, for example in Figure 6 an aneroid barometer 25 may transmit movement to a lever 32 which controls a rheostat 33 arranged in a control circuit 34 including a relay 35. The armature of the relay 35 is connected by a rod 36 through a pivoted lever 27 to the upper end 29 of the rod 30. The lever 27 is freely engaged at 37 by a member attached to one end of a spring 38, the point of engagement 37 being adjustable by means of a cam 39 so that the effective movement imparted from the armature of the relay 35 to the rod 30 can be adjusted. In the arrangement illustrated in Figure 7 an expansible rod 31 such as that described with reference to Figure 5 operates a lever 32 which adjusts a rheostat 33 included in a circuit 34. The expansion or contraction of the rod 31 due to variations in the atmospheric temperature thus causes an increase or decrease of the resistance in the circuit 34 and therefore the supply of current to means such, for example, as a relay for transmitting the control impulses to the regulating apparatus. In the construction illustrated in Figure 8 a cord 28 as described with reference to Figure 4 is employed to adjust a rheostat 33 and thereby vary the resistance of a circuit 34 in a manner similar to that described with reference to Figures 6 and 7.

In the construction illustrated in Figure 9 a mercury barometer 40 is furnished with a series of electrodes arranged at different levels and constituting tappings from a resistance 42 arranged in a power circuit 34. As the mercury in the barometer rises or falls due to an increase or decrease of the atmospheric pressure the effective resistance 42 is decreased or increased and the current flowing through the circuit 34 thereby increased or decreased. In the construction illustrated in Figure 10 the control device comprises a mercury thermometer 41 having electrodes arranged in a manner similar to that described with reference to Figure 9, the circuit 34 containing a relay 35 from which regulating impulses are transmitted to the rod 30 by mechanism similar to that described with reference to Figure 6.

With a view to transmitting the regulating impulses without adjusting the current supply, three solenoids 43, 44, 45 (Figure 11) may be provided, the control of these solenoids being effected for example by means of a mercury barometer 40. Thus when the atmospheric pressure rises sufficiently for the solenoid 43 to be rendered operative, the rod 46 is moved upwards against the action of a control spring, and the rod 30 connected, for example, to a sleeve 26 of a servo-motor as shown in Figure 3 is moved downwards. On the atmospheric pressure increasing still further the relay 44 is rendered operative and the rod 46 raised further, whilst operation of the relay 45 will cause the rod 46 to be raised still further.

Since the temperature of the exhaust gas of an internal combustion engine is influenced by the degree of combustion of the charge within the engine cylinder, the temperature of the exhaust gas will tend to be influenced in accordance with a condition or conditions of the combustion air drawn in to the cylinder. The fuel-air ratio may thus, in accordance with the present invention, be controlled in accordance with the temperature of the exhaust gases. Thus, as illustrated, for example, in Figure 12 each of the exhaust conduits 47 leading to individual cylinders may be furnished with a thermostat 48 of the bimetallic type so constructed as to move a lever or finger 49 to the right or to the left in accordance with variations in the temperature of the exhaust gas. When the temperature of the exhaust gas flowing through any one of the conduits 47 is low, the finger 49 is moved towards the left, thereby tending to cut out the relays 43, 44 and 45. On an increase in the temperature of the exhaust gas the finger 49 tends to move to the right, thereby first rendering the relay 43 operative and, on the temperature still increasing, the relays 44 and 45 so as to move the rods 46 and 30 upwards. Figure 13 illustrates an alternative construction in which the exhaust manifold 50 is furnished with a single thermostat 51 operatively connected through a rod 52 to a lever 53 which in turn is connected at 29 to the rod 30. In this arrangement the temperature of the exhaust gases collectively is employed for regulation purposes. At high temperatures of the exhaust gas the rod 30 is raised whilst at low temperatures the rod 30 is moved downwards. It will be understood that instead of employing the temperature of the exhaust gases other properties of these gases may be utilized, such for example as the composition or physical properties of the exhaust gases.

Instead of employing a single control device so as to impart regulating impulses in accordance with a single condition of the atmosphere, several control devices may be employed together as illustrated, for example, in Figure 14 in which an aneroid barometer 25, a cord 28 and an expansible rod 31 respectively control rheostats 54 arranged in series in a control circuit 34. The current flowing through a relay 35 (as described with reference to Figure 6) will then be proportional to the sum of the effective resistances of the rheostats 54. Alternatively, as illustrated in Figure 15, three control devices 25, 28, 31 may be arranged so as to control valves 55 each arranged to regulate the flow of pressure medium through pipes 56 to a servo-motor comprising a cylinder 57 and piston 59. The piston 59 is controlled by a spring 60 and is connected by a rod 61 to a lever 62 the free end of which is connected to the upper end 29 of the rod 30. The discharge of pressure medium from the servo-motor can be set by means of a throttling device 58. The pressure beneath the piston 59 of the servo-motor 57 will thus be a function of the sum of the cross-sectional areas available for the flow of pressure medium through the valves 55 and also of the cross-section of the throttling device 58. The piston 59 will in this way be raised to a greater or less extent in accordance with the atmospheric pressure, temperature and moisture content, the rod 30 being raised or lowered in accordance with the sum of the variations in these atmospheric conditions.

In Figure 16 each of the control devices 25, 28 and 31 is arranged to operate a plunger 63 which projects into a cylinder containing a piston 64 operatively connected through a rod 65 to a lever 66 connected in turn to the upper end 29 of the rod 30. The sum of the movements of the control devices 25, 28 and 31 is thus effective on the piston 54 whose movement is transmitted to the rod 30.

The movements of several control devices may be mechanically superimposed as indicated in Figure 17 in which the control devices 25, 28 and 31 carry rollers 67, 68, 69 respectively which engage a cord 70 anchored at one end to a fixed point and connected at its opposite end to a lever 71 connected at 29 to the rod 30.

If desired the fuel-air ratio may be adjusted by varying the degree of precompression of the combustion air supplied to the engine. Thus, for example, as illustrated in Figure 18 the cylinders of the internal combustion engine 1 are supplied with combustion air from a compressor 72 to an induction manifold 73. An electric motor 74 supplied with current from a power circuit 75 drives the compressor 72, a switch 76 being provided for setting the speed of the compressor, and thus its output, to suit the desired speed of the engine. A rheostat 77 is operated through a rod 78 in accordance with a condition or conditions of the atmosphere, for example by means of one or more of the control devices above described. During normal working of the engine the quantity of air drawn in is suitable for efficient combustion of the fuel, the resistance 77 being in the position shown so that a switch 79 is open and the compressor is thus inoperative. At the same time an air control valve 80 is retained in its open position due to the solenoid 81 of a relay being in its position of rest, the combustion air being thus drawn in solely under the action of the pistons of the engine 1. If however the weight of air drawn in is not enough to ensure efficient combustion of the fuel supplied, for example, when the engine is employed at a high altitude, high atmospheric temperature or when the atmosphere has a high moisture content, the rheostat 77 will be moved so that the switch 79 will be closed and current thus supplied to the motor 74 so that the compressor 72 will supply air to the engine. When the switch 79 is closed the armature 81 will be drawn into its cooperating solenoid and the air valve 80 will be closed. The rheostat 77 will thus be adjusted in accordance with the condition or conditions of the atmosphere so that the weight of air delivered to the engine by the compressor will be in accordance with such condition or conditions and efficient combustion of the fuel will be ensured.

Figure 19 illustrates an arrangement somewhat similar to that shown in Figure 18 but employing a reciprocating piston 82 which supplies air to a reservoir 83 from which the air passes through a nozzle 84 into the induction pipe 85 of the engines. Owing to the injector action of the air delivered through the nozzle 84 the air will be compressed in the pipe 85 so that a greater weight of air will be supplied to the internal combustion engine than when this operates by suction alone, that is by drawing air through the air inlet 86.

It will be understood that the constructions above described have been given by way of example only and that details may be modified. For example, the invention may be applied either to engines of the two-stroke type or those of the four-stroke type. Further, the means by which the fuel-air ratio is maintained in accordance with a condition or conditions of the atmosphere may be constructed as desired and may be employed in conjunction with any suitable form of transmission mechanism or servo-motor apparatus.

I claim:

1. In an internal combustion engine electric power unit for vehicles, and including a generator, means for automatically determining the fuel-air ratio in accordance with a condition of the atmosphere, and means connecting same to the generator for controlling the generator and thereby the operation of the engine.

2. An internal combustion engine power unit for vehicles as claimed in claim 1 in which means are provided to regulate the generator and thereby regulate the engine in accordance with the load, said means being controlled, in accordance with a condition of the atmosphere, by an auxiliary device.

3. In an internal combustion engine-electric power unit for vehicles, and including a generator, means for automatically determining the fuel-air ratio of the charge supplied to the engine by automatic adjustment of one of the quantity of fuel and the quantity of air, through the generator, and in accordance with a condition of the atmosphere.

4. In an internal combustion engine-electric power unit for vehicles including a generator, the combination with apparatus for determining the fuel-air ratio in accordance with the generator and thereby in accordance with the load, of means whereby the determination of this ratio is controlled in accordance with a condition of the atmosphere.

5. An internal combustion engine power unit as claimed in claim 3, in which determination of the fuel-air ratio of the charge is effected through the generator by adjusting the relation between the load on the engine through the generator and the quantity of fuel in accordance with a condition of the atmosphere.

6. In an internal combustion engine-electric power unit for vehicles including a generator, the combination with means for regulating the load on the engine through the generator and the fuel supply in accordance with the engine speed, of means for influencing the relation between the load and engine speed in accordance with a condition of the atmosphere.

7. In an internal combustion engine-electric power unit for vehicles, the combination with a main current generator driven by the engine, of a governor for regulating the supply of fuel in accordance with the engine speed, a servo-motor operated by the governor, and actuating means for controlling the load on the main generator, and at least one control device adapted to influence the operation of the servo-motor in accordance with a condition of the atmosphere to control the generator and thereby the load on the engine.

8. In an internal combustion engine-electric power unit for vehicles including a generator, th combination with apparatus for supplying air under pressure to the engine, of means for automatically controlling, through the generator, in accordance with a condition of the atmosphere, the weight of air supplied.

9. An internal combustion engine power unit as claimed in claim 1, in which the ratio of the quantity of fuel to the weight of air is automatically controlled in accordance with at least one of the pressure, temperature or moisture content of the atmosphere to thereby control the generator.

10. An internal combustion engine power unit for vehicles as claimed in claim 1, in which the ratio of the quantity of fuel to the weight of air is automatically controlled in accordance with a condition of the exhaust gases as affected by a condition of the atmosphere to thereby control the generator and hence the load on the engine.

11. In an engine-electric vehicle including an electric generator, means for regulating the output of the current generator in dependence on at least one of the determinant conditions of the atmosphere surrounding the engine.

12. A vehicle as in claim 11, in which the additional influence of the regulating device is produced in dependence on the waste gas properties modified by the changes of the atmosphere.

13. In an engine-electric vehicle and including a generator, a speed governor, a device influenced by the speed governor for controlling the load of the generator, and a device controlled by at least one determinant factor of the atmosphere surrounding the internal combustion engine for additionally influencing said first device.

OSCAR SIMMEN.